United States Patent [19]
Bäker

[11] Patent Number: 5,743,481
[45] Date of Patent: Apr. 28, 1998

[54] SAFETY DEVICE IN CONJUCTION WITH A TENSIONING MECHANISM OF A SAFETY BELT SYSTEM, INCLUDING AUDIBLE ACTUATION INDICATION

[75] Inventor: Matthias Bäker, Hamburg, Germany

[73] Assignee: Autoliv Development AB, Vargarda, Sweden

[21] Appl. No.: 796,322

[22] Filed: Feb. 7, 1997

Related U.S. Application Data

[62] Division of Ser. No. 497,075, Jun. 30, 1995, Pat. No. 5,660,347.

[30] Foreign Application Priority Data

Jun. 30, 1994 [DE] Germany .......................... 44 22 665.9
Jan. 10, 1995 [DE] Germany .......................... 195 00 506.6

[51] Int. Cl.⁶ .......................... B60R 22/18; B60R 22/46; B60Q 5/00; G08B 3/02
[52] U.S. Cl. .......................... 242/374; 280/806; 297/480; 116/28 R; 116/67 R
[58] Field of Search .......................... 242/374, 379.1; 280/805, 806; 297/470–472, 478, 480; 116/28 R, 67 R; 200/61.17, 61.58 B; 340/438

[56] References Cited

U.S. PATENT DOCUMENTS

| | | | |
|---|---|---|---|
| 3,418,627 | 12/1968 | Lyons | 116/67 R |
| 3,428,362 | 2/1969 | Bertelson et al. | 297/472 |
| 3,866,854 | 2/1975 | Wehner | 242/387.1 |
| 3,980,988 | 9/1976 | Spizzo | 200/61.58 B |
| 4,278,043 | 7/1981 | Heath | 116/28 R |
| 4,618,108 | 10/1986 | Butenop et al. | |
| 4,702,492 | 10/1987 | Andrres et al. | 280/805 |

FOREIGN PATENT DOCUMENTS

| | | |
|---|---|---|
| 1913448 | 9/1970 | Germany . |
| 3925570 | 2/1991 | Germany . |

*Primary Examiner*—John M. Jillions
*Attorney, Agent, or Firm*—Robert W. Becker & Associates

[57] ABSTRACT

A safety device in conjunction with a tensioning mechanism or a force-limiting device of a safety belt system of motor vehicles. The safety device includes a signal device for indicating actuation of the tensioning mechanism or force-limiting device, and after actuation, a signal device extends into a path of movement of a functional component of the safety device so that upon subsequent operation of the safety device, the signal device generates an audible signal.

7 Claims, 9 Drawing Sheets

5,743,481

SAFETY DEVICE IN CONJUCTION WITH A TENSIONING MECHANISM OF A SAFETY BELT SYSTEM, INCLUDING AUDIBLE ACTUATION INDICATION

This application is a division of application Ser. No. 08/497,075 filed Jun. 30, 1995, now U.S. Pat. No. 5,660,347.

BACKGROUND OF THE INVENTION

The present invention relates to a safety device, such as a belt roll-up mechanism, a safety belt buckle, and the like, in conjunction with a tensioning mechanism or a force-limiting means of a safety belt system in motor vehicles; a signal device is included for indicating actuation of the tensioning mechanism.

Safety devices such as belt roll-up mechanisms and safety belt buckles are these days frequently combined with tensioning mechanisms; see, for example, U.S. Pat. No. 4,618,108 for a safety belt roll-up mechanism, and DE-OS 39 25 570 for a safety belt buckle.

The fundamental problem with such safety devices is that the pertaining tensioning mechanisms can be actuated unnoticed, with this unintended actuation not being recognizable for the user. Such an unintended actuation can even take place during transport or during assembly of the safety belt system in the motor vehicle, for example in the case of an unused passenger safety belt, without this being recognized. With safety belt roll-up mechanisms it is furthermore desired that the roll-up mechanism still be functionable after actuation of the tensioning mechanism, so that also for this reason the actuation of the tensioning mechanism cannot be recognized by the functioning of the safety belt roll-up mechanism.

To resolve this problem it is already known by use to provide, for example, safety belt buckles having associated tensioning mechanisms with an optical indicator for the effected buckle movement, whereby, for example upon actuation of the tensioning mechanism, a little flag or the like that is recognizable by the user can be released from the housing. In another design, the function of an electrically ignited pyrotechnical rotational tensioner is tested by a diagnosis plug upon maintenance of the vehicle to check for satisfactory functioning and hence for an actuation that may have occurred.

To the extent that mechanically triggered tensioning devices for safety belt systems having mechanical and also pyrotechnical energy actuators are used, such possibilities are not possible for indicating actuation, and frequently the space is also not available for providing optical indicators.

It is therefore an object of the present invention to improve safety devices of the aforementioned general type such that a simple, space-saving actuation indicator can be provided.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

Figure 1:
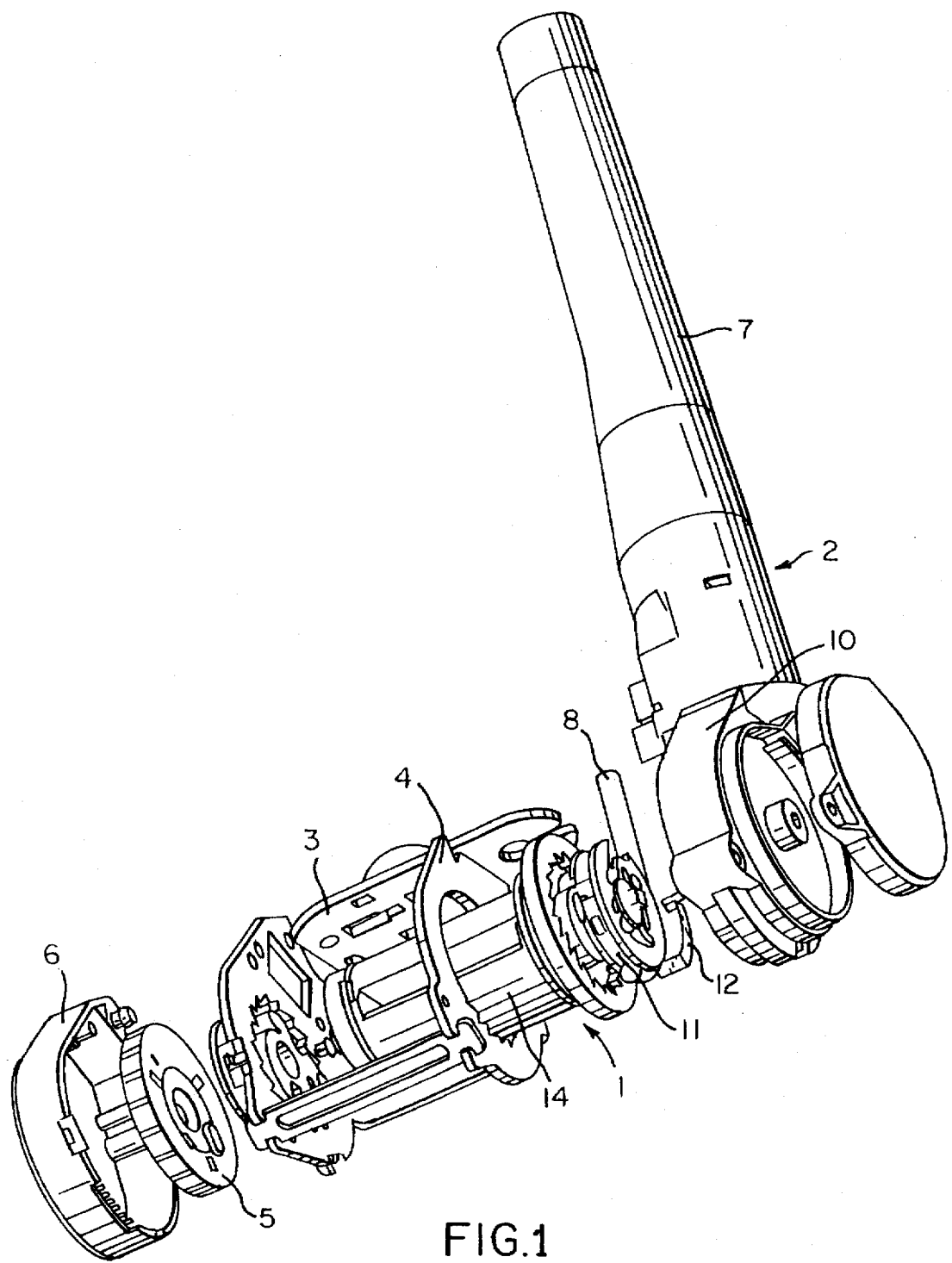
FIG. 1 shows one exemplary embodiment of a safety belt roll-up mechanism with an associated tensioning mechanism and an actuation indicator.

The safety device of the present invention is characterized primarily by providing a signal means for indicating actuation of the tensioning mechanism, whereupon after such actuation the signal means extends into the path of movement of a functional component of the safety device so that upon subsequent operation of the safety device, the signal means generates an audible signal. An advantage afforded by the present invention is that in a straightforward manner the signal means that generate an audible signal can be integrated in the safety device without requiring any additional space or any additional connections to the motor vehicle, i.e., electrical control means thereof.

In an embodiment where the safety device is a safety belt roll-up mechanism that is combined with a tensioning mechanism, there is disposed in a protective cover of the safety device a spring element that upon actuation of the tensioning mechanism is released by the coupling of the tensioning mechanism with the belt roll-up shaft, whereupon a spring arm of the spring element comes into contact against the belt roll-up shaft.

Pursuant to a specific embodiment of the present invention where a cable pulley, which is a component of the tensioning mechanism, is adapted to be coupled to the belt roll-up shaft, the pulley is provided with a safety abutment associated with the spring element for fixing the position of the spring element in its rest position, and for releasing the spring element upon rotation of the pulley when the tensioning mechanism is actuated.

In a specific embodiment of the safety device in the form of a safety belt buckle that is combined with a tensioning mechanism, and which includes a longitudinally displaceable ejector disposed in the buckle housing and a tongue that is adapted to be inserted into the buckle and to be held in position therein by a latching mechanism, the spring element is disposed in the safety belt buckle; upon actuation of the tensioning mechanism, a spring arm of the spring element is released and extends into the path of movement of the ejector and/or the tongue and/or the latching mechanism.

It should be noted that the present invention is useful not only with safety devices that cooperate with tensioning mechanisms, but in general can be used with safety devices that are provided with auxiliary devices such as a force-limiting means. What is involved here is being able to make recognizable the actuation of the force-limiting means, which actuation is otherwise no longer noticeable in the subsequent functioning. One embodiment of the present invention is directed to a safety device in the form of a self-blocking belt roll-up mechanism having a blocking mechanism that can be activated by vehicle-sensitive and/or safety belt-sensitive means, the roll-up mechanism being provided with a force-limiting means for limiting belt withdrawal, the force-limiting means becoming effective in the event of blocking via a belt withdrawal force that, in a belt unwinding direction, acts on an associated safety belt shaft. A device of this type is known from DE-OS 19 13 448, and can also be utilized without the use of a tensioning mechanism with the described advantages of a force-limiting means.

With such a safety device in the form of a safety belt roll-up mechanism, it is expedient, in conjunction with a load that occurs, to indicate whether or not the force-limiting means has already been activated, because this can no longer be noticed during subsequent use of the belt roll-up mechanism. Thus, pursuant to one embodiment of the present invention, to solve this problem a signal means is provided that is released by the limited belt withdrawal in the belt unwinding direction, wherein upon further rotation of the safety belt shaft, the signal means, such as a spring element, generates an audible signal. This embodiment of the invention offers the advantage that when the force-limiting means becomes effective, the spring element is released, so that during any subsequent movement of the belt roll-up shaft, the spring element slides over the associated toothing that is stationary on the housing, thereby generating an appropriate noise. Thus, even without any further checking of the safety device, it can be determined whether or not the force-limiting means has been activated.

Pursuant to a specific embodiment of the present invention, at an end face of the safety belt shaft that faces a base plate for the blocking mechanism (toothed plate), a biased spring element can be held in position by an abutment disposed on the base plate, whereupon the spring element is released from the abutment upon limited belt withdrawal and any further rotation of the shaft, either in a belt withdrawal direction or in a belt roll-up direction, will result in the spring element sliding over a further toothed component of the blocking mechanism that is stationary on a housing. In this connection, the spring element is expediently disposed on a pin that in turn is disposed on the end face of the safety belt shaft and extends through a slot in the base plate; a free arm of the spring element is held in position on the abutment, which is in the form of a projection on the base plate.

Further specific features of the present invention will be described in detail subsequently.

DESCRIPTION OF PREFERRED EMBODIMENTS

Referring now to the drawings in detail, FIG. 1 illustrates a safety device that is comprised of a safety belt roll-up mechanism 1 and a tensioning mechanism 2 that cooperates therewith. The U-shaped housing 3 of the roll-up mechanism 1, with associated side pieces 4, accommodates a belt roll-up shaft 14, upon which a non-illustrated safety belt can be wound or from which it can be unwound. At its left end, the shaft 15 in connected to a winding spring 5 that is held in an end cap 6. The tensioning mechanism 2 comprises a tube 7 in which a non-illustrated piston drives a cable 8 that is guided about a pulley 11 which is disposed in a protective cover 10 and can be coupled with the shaft 14. If upon actuation of the tensioning mechanism 2 the piston that is guided in the tube 7 is driven upwardly, it pulls the cable 8 from the pulley 11; in a manner the details of which are not important for the present invention, the pulley 11 is coupled with the shaft 14 and thereby turns the shaft 14 in a tensioning direction.

Figure 2:
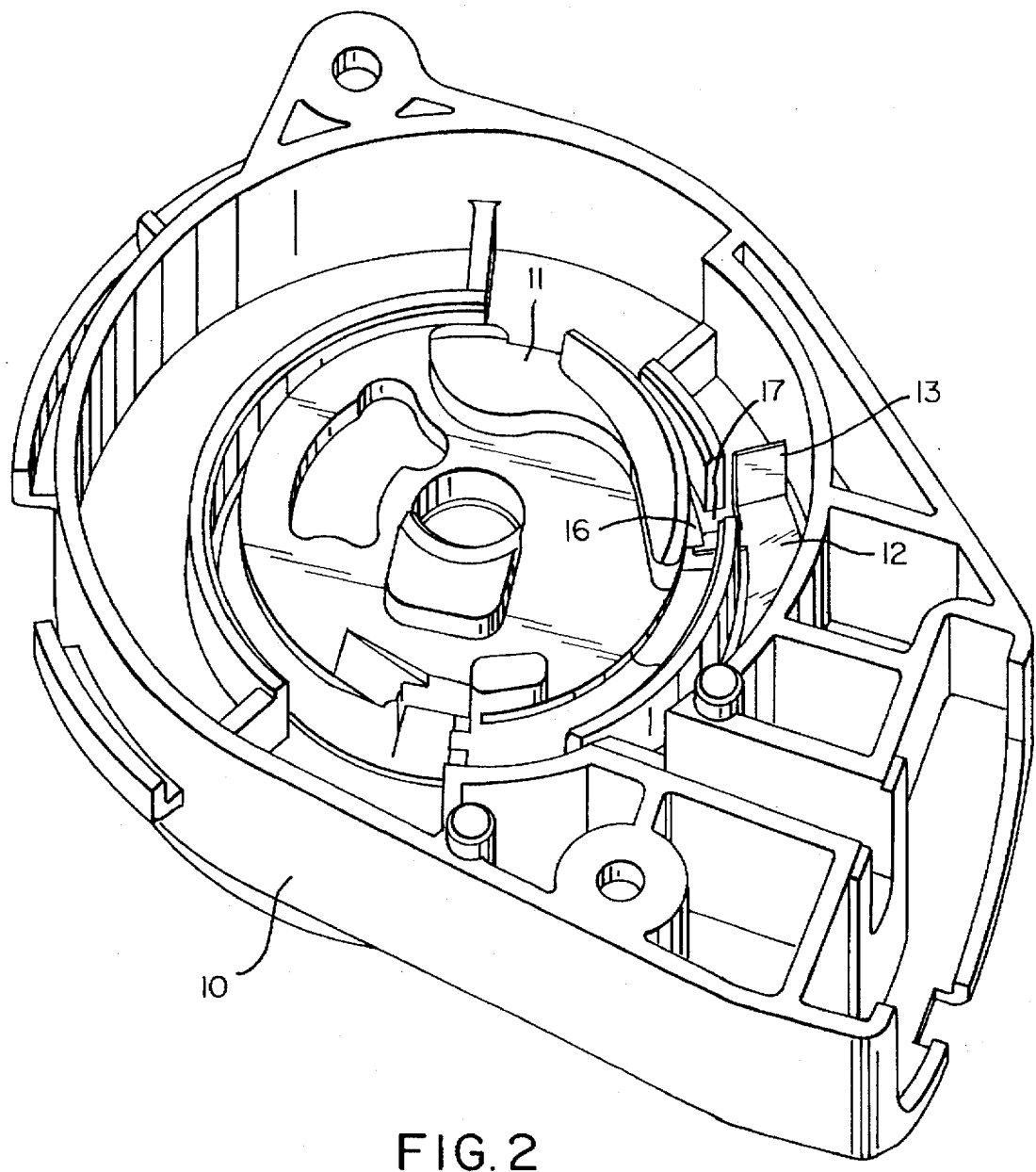
FIG. 2 is a plan view of the protective cover that has been removed from the safety belt roll-up mechanism of FIG. 1 and also shows the actuation indicator.
Figure 3:
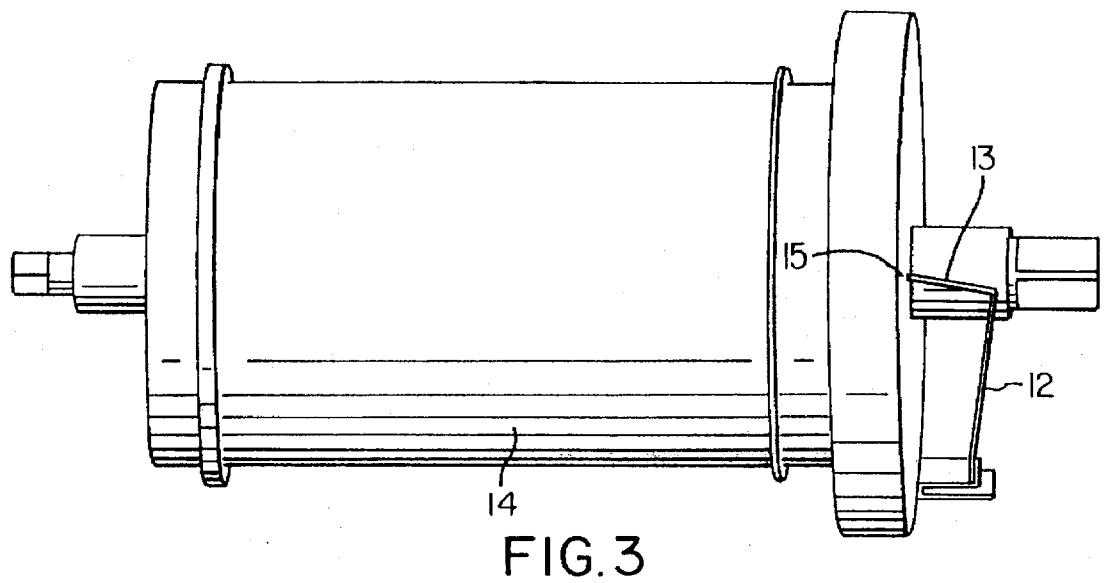
FIG. 3 shows the belt roll-up shaft with the actuation indicator of FIG. 2.

The protective cover 10 is shown in detail in FIG. 2, with the pulley 11 being a component of the tensioning mechanism. Disposed in the protective cover 10 is a spring element 12 that is provided with a spring arm 13 which projects in a direction toward the belt roll-up shaft 14, which is connected to the pulley 11. In the rest position of the tensioning mechanism, the spring arm 13 has a clearance 15 from the belt roll-up shaft 14, as schematically indicated in FIG. 3. For this purpose, the outer periphery of the pulley 11 is provided with a safety abutment 16 that in turn cooperates with a projection 17 of the spring element 12 disposed in the associated plane for preventing engagement of the spring arm 13 of the spring element 12 with the belt roll-up shaft 14 in the rest position of the tensioning mechanism.

Figure 5:
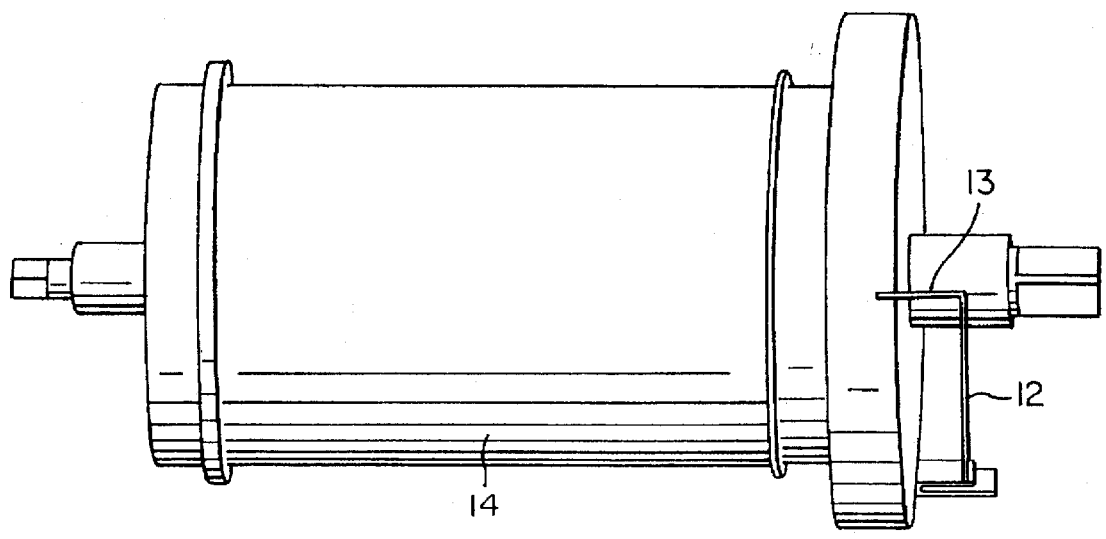
FIG. 5 shows the belt roll-up shaft along with the actuation indicator of FIG. 4.
Figure 4:
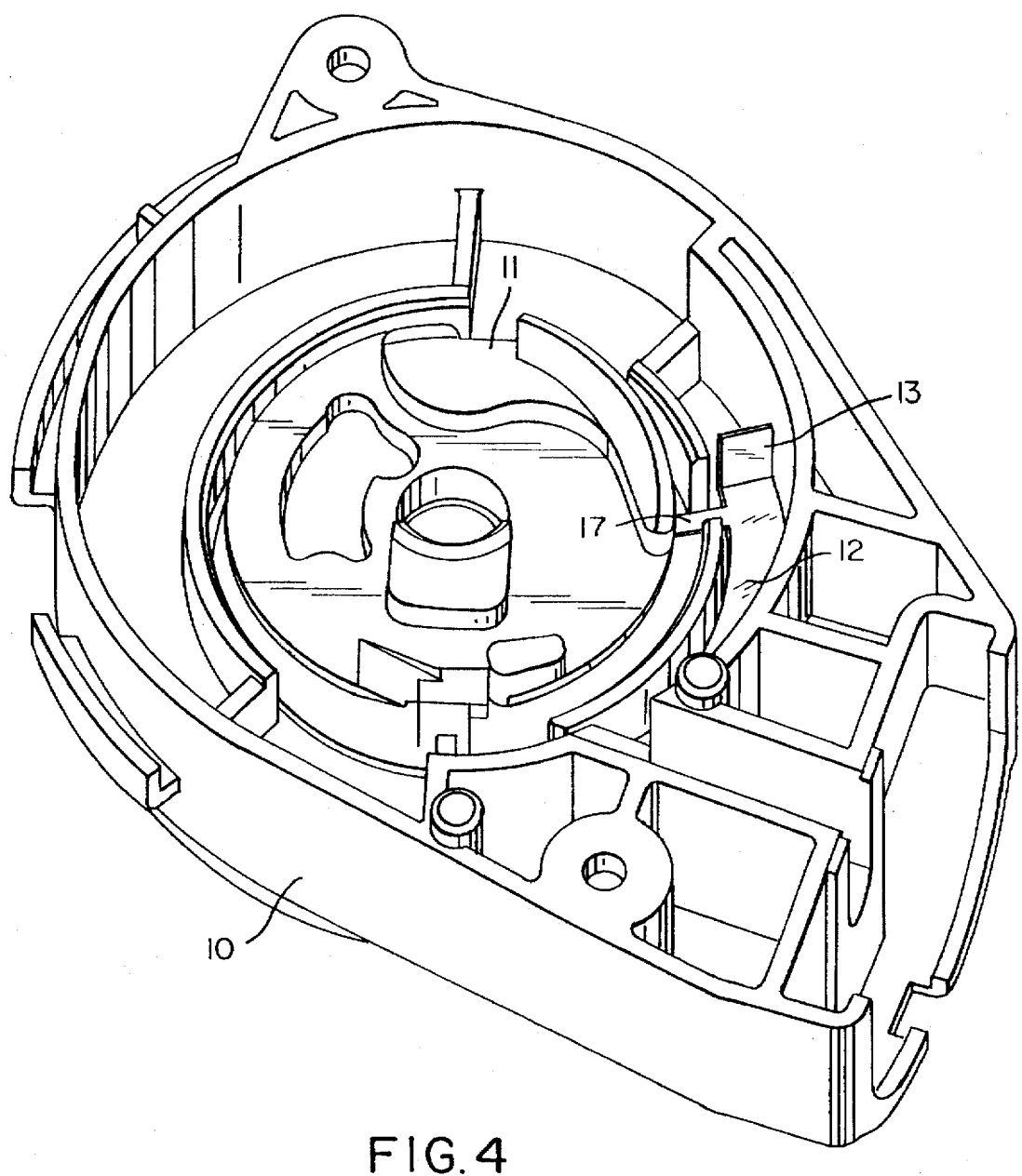
FIG. 4 is a view similar of that of FIG. 2 with the tensioning mechanism actuated.

If upon actuation of the tensioning mechanism the pulley 11 turns, the safety abutment 16 of the pulley 11 frees the projection 17 of the spring element 12, so that in conformity with the view illustrated in FIGS. 4 and 5, the spring element 12 pivots in a direction toward the belt roll-up shaft 14, whereupon the spring arm 13 comes into engagement against the end of the shaft 14, so that if the safety belt roll-up mechanism is used, when the shaft 14 rotates a scratching or scraping noise, and hence an audible signal, is generated as an indicator of actuation.

Figure 6:
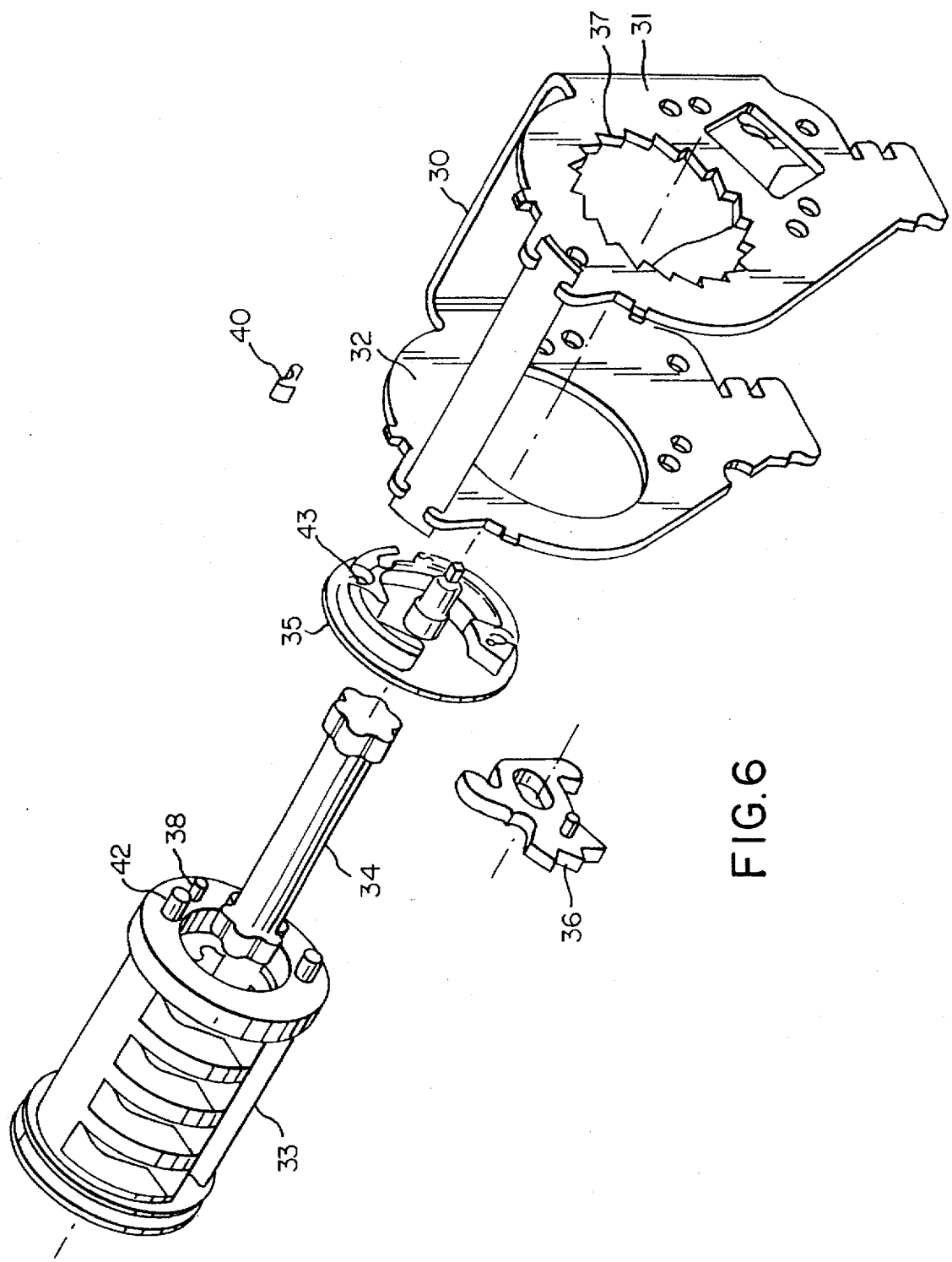
FIG. 6 shows a safety belt roll-up mechanism with a force-limiting means.
Figure 7:
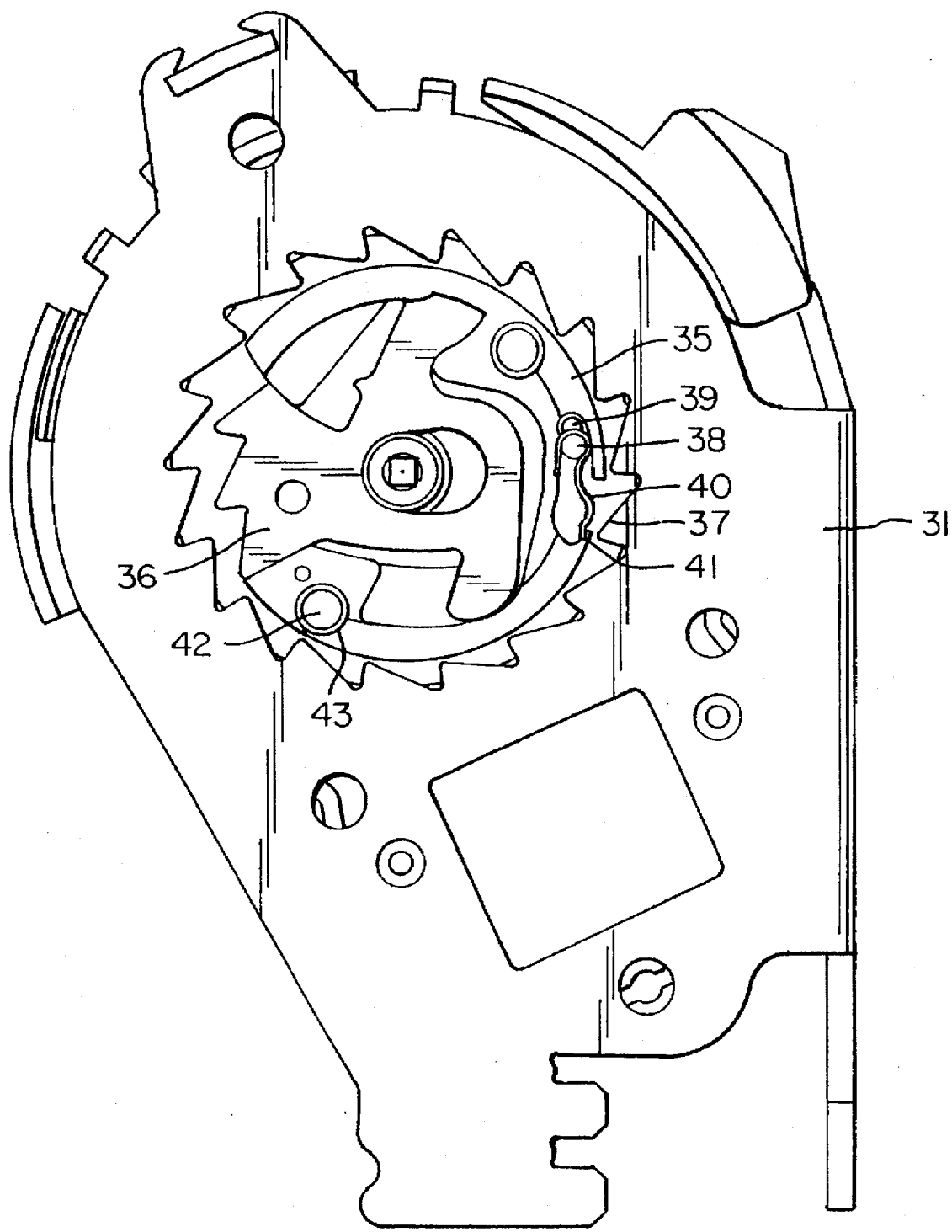
FIG. 7 is a plan view of the end face of the safety belt roll-up mechanism of FIG. 6 as associated with the blocking mechanism, with the spring element fixed in position.
Figure 8:
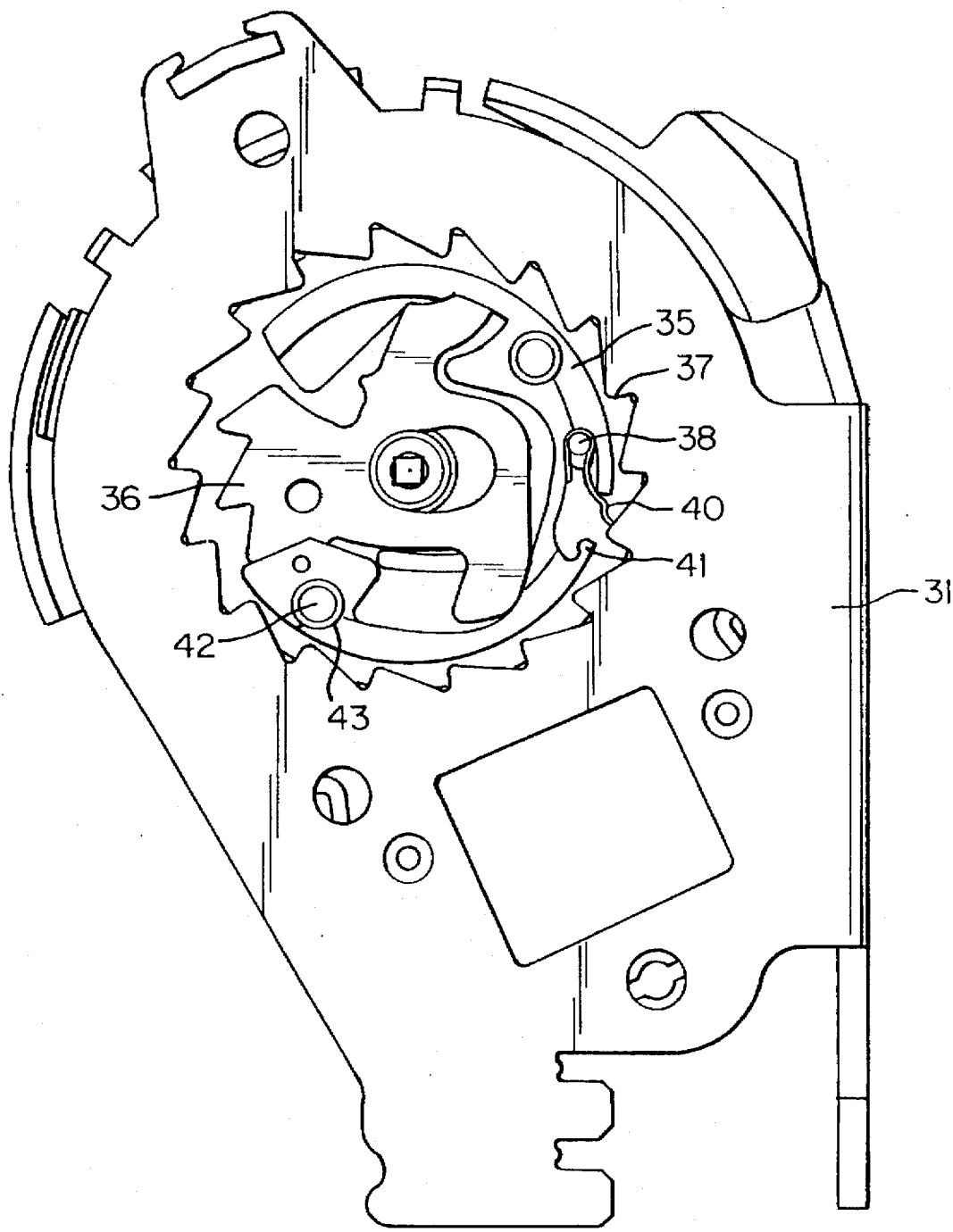
FIG. 8 is a view similar to of that of FIG. 7 with the spring element released.

FIGS. 6 to 8 illustrated an embodiment of the present invention directed to a self-blocking belt roll-up mechanism having a force-limiting mechanism for a limited safety belt withdrawal. The U-shaped belt roll-up housing 30, with its associated side pieces 31, 32, accommodates a shaft 33 on which a non-illustrated safety belt can be wound or from which it can be unwound. Disposed within the shaft 33 is a torsion bar 34 that cooperates with the remaining parts of the belt roll-up mechanism, and the shaft 33, in a manner that is not determinative for the configuration of the present embodiment of the invention. The blocking device includes, among other things, a base plate 35 that is connected to the shaft 33 via a mortise and tenon connection 42,43, rotates with the shaft 33, and in case of blockage is rested relative to the further rotational movement of the shaft 33. Mounted radially between a release position and a blocking position in the base plate 35 is a toothed plate 36; in the blocking position, the toothed plate 36 engages the internal toothing 37 of the opening provided in the side piece 31. For this purpose, the end face of the shaft 33 with its torsion bar 34 are expediently connected to the base plate 35.

With respect to the configuration of the device that produces an audible signal, a pin 38 is disposed on that end face of the shaft 33 that faces the base plate 35. The pin 38 extends through a slot 39 in the base plate 35 (FIGS. 7, 8); disposed on the pin 38 in the plane of the base plate 35 is a spring element 40 which with appropriate bias is fixed in a particular position by means of a projection 41 in the form of an abutment provided on the base plate 35; in this position, the spring element 40 does not project beyond the periphery of the base plate 35.

During normal operation, the shaft along with the base plate 35 rotate in the openings of the side pieces 31, 32. In the event of blocking, the toothed plate 36 pivots out into the internal toothing 37, thereby fixing the position of the base plate 35. Due to the arrangement of the torsion bar 34, further rotation of the shaft 33 by a certain amount is possible; this further rotation shifts the pin 38 in the slot 39 of the base plate 35 so that the spring element 40 slides off of the projection 41, whereby due to its preload or bias it pivots outwardly, in so doing coming into contact against the internal toothing 37 of the belt roll-up housing 30. With subsequent further rotation of the shaft 33, the spring element 40 slides over the internal toothing 37 and thereby generates a corresponding noise, as a result of which the fact that the force-limiting device, in the form of a torsion bar 34, has become operative can be detected. The shape of the free end of the spring element 40 is such that it does not obstruct the normal winding and unwinding of the safety belt; in other words, the spring element glides over the toothing in both directions accompanied by a corresponding generation of noise.

Figure 9:
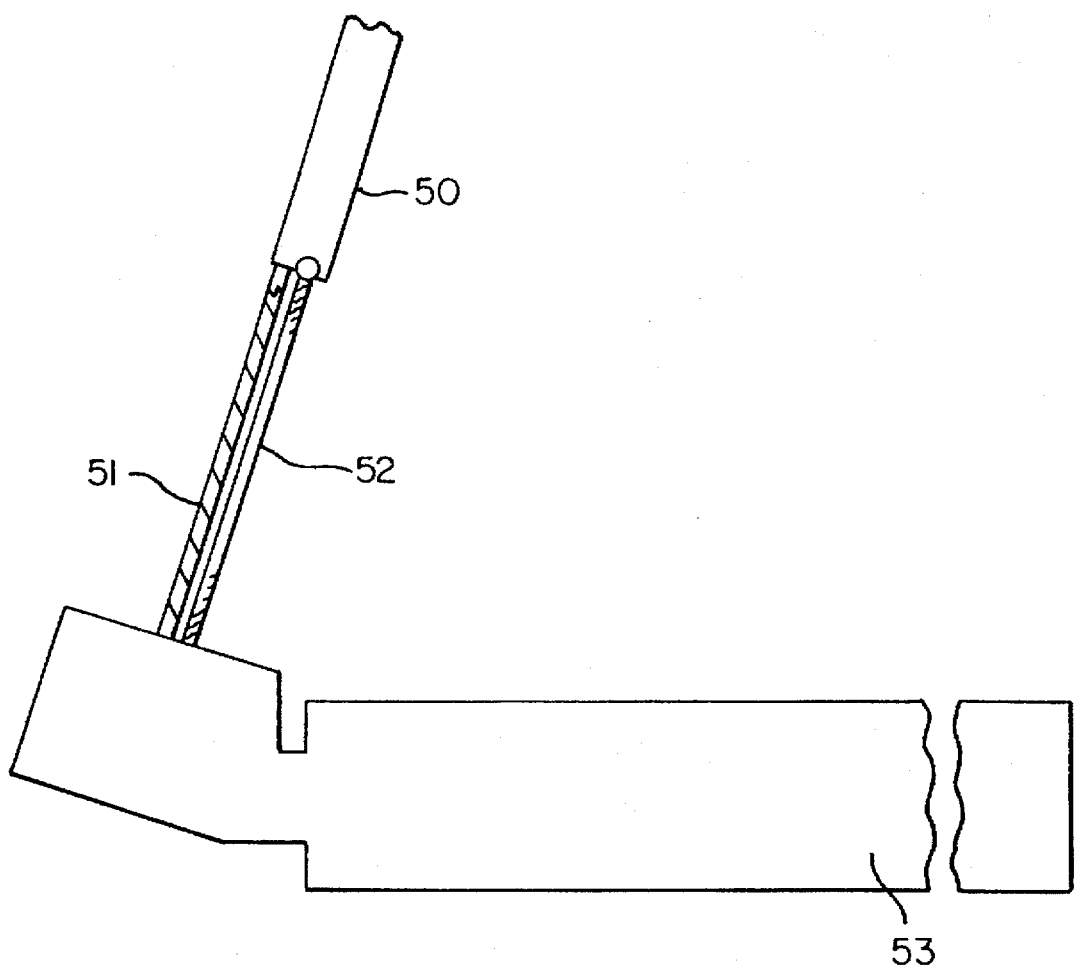
FIG. 9 shows a safety belt buckle in conjunction with a tensioning mechanism.
Figure 10:
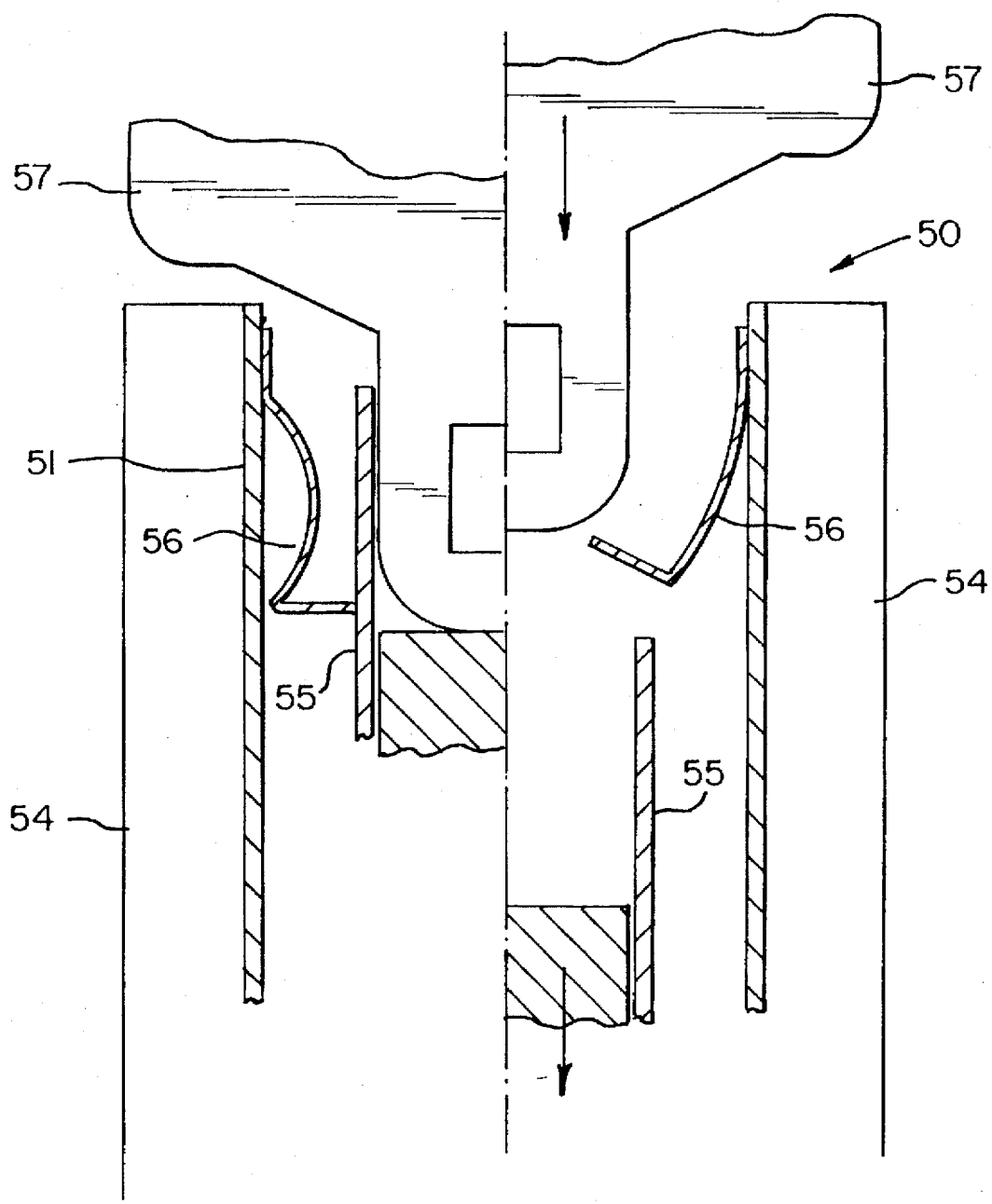
FIG. 10 shows the safety belt buckle with the actuation indicator in a position of rest (left half of FIG. 10) and with the indicator released ( right half of FIG. 10).

FIGS. 9 and 10 illustrate the realization of the present invention with a safety belt buckle; with this safety belt mechanism, a spring element that is embodied similar to the spring element of the embodiments of FIGS. 1 to 8 is released by the actuation of the tensioning mechanism, whereby an associated spring arm thereof extends into the path of movement of a component of the safety belt buckle, for example the buckle tongue, thereby again being able to cause an audible signal that is produced with the movement. Other parts of the safety belt buckle, such as the ejector or latching mechanism, can also be utilized for contacting the spring arm.

In the schematic illustration of the FIG. 9, a safety belt buckle 50 is movable in the tensioning situation relative to a schematically indicated holder or support means 51. A cable 52 serves for this purpose, with one end of the cable being connected to the safety belt buckle 50, while the other end is guided into a tensioning mechanism 53. Upon actuation, the cable 52 is drawn into the tension mechanism 53 so that the safety belt buckle 50 moves relative to the support means 51, as illustrated in the one specific embodiment shown in FIG. 10. The left half of FIG. 10 shows the starting position of the safety belt buckle 50 relative to the support means 51, whereas the right half of FIG. 10 schematically illustrates the position of the safety belt buckle relative to the support means 51 after conclusion of the tensioning process.

As shown in detail in FIG. 10, the safety belt buckle 50 comprises an outer housing 54 and inner buckle housing member 55 in which are disposed the functional components of the safety belt buckle, such as the latching mechanism, the release mechanism, and the ejector; the cable 52 engages the buckle member 55. As shown in the drawing, the buckle member 55 is disposed within the support means 51, whereas the housing 54 surrounds the outside of the support means 51. Upon actuation of the tensioning mechanism 53, the buckle member 55 is pulled downwardly in the support means 51 via the cable 52 that is connected thereto, as can be seen in the right half of FIG. 10.

Disposed on the inner side of the support means 51 is a spring element 56 that serves for generating an audible signal. In the position of rest, the spring element 56 is held in its rest position by the buckle member 55 that is disposed in the support means 51. If in the tensioning situation the buckle member 55 moves into the support means 51, the buckle member 55 then releases the spring element 56 so that it can pivot into the path of movement of the buckle member 55. If after actuation of the tensioning mechanism 53 the safety belt buckle 50 is now operated by inserting the buckle tongue 57, this tongue strikes against the spring element 56, which extends into the path of movement of the tongue, before the buckle tongue 57 reaches the deeper buckle member 55, so that the noise generated by the contact between the buckle tongue 57 and the spring element 56 indicates to the user that the tensioning mechanism has been actuated.

The present invention is, of course, in no way restricted to the specific disclosure of the specification and drawings, but also encompasses any modifications within the scope of the appended claims.

What I claim is:

1. A safety alarm device for a vehicle safety belt system comprising:

a tensioning mechanism for tensioning the safety belt in an emergency situation of the vehicle;

said safety belt system including a functional component which is moved during a normal use of the safety belt system, signal means for indicating actuation of said tensioning mechanism, said signal means, after said actuation, extending into a path of movement of the functional component of said safety device so that upon subsequent operation of said safety belt system, said signal means generates an audible signal.

2. A safety alarm device according to claim 1, wherein said signal means is a spring element.

3. A safety alarm device according to claim 1, wherein said safety belt system includes a safety belt buckle and said signal means is an element that is released by said tensioning mechanism upon actuation thereof, whereupon said element extends into a path of movement of a movable part of said buckle and is adapted to come into contact with said part.

4. A safety alarm device according to claim 1, wherein said safety belt system includes a belt roll-up mechanism and said signal means is an element that is released by a coupling mechanism of a belt roll-up shaft upon actuation of said tensioning mechanism, whereupon said element is adapted to be brought into contact with a rotatable or movable part of an automatic belt-blocking mechanism.

5. A safety alarm device according to claim 2, wherein said safety belt system includes a safety belt roll-up mechanism having a protective cover, and wherein upon actuation of said tensioning mechanism said spring element, which is disposed in said protective cover, is released by coupling means provided between said tensioning mechanism and a belt roll-up shaft, whereupon a spring arm of said spring element comes into contact against said belt roll-up shaft.

6. A safety alarm device according to claim 5, wherein said coupling means includes a cable pulley that is adapted to be coupled to said belt roll-up shaft, said pulley being provided with a safety abutment for holding said spring element in a rest position thereof and for releasing said spring element upon rotation of said pulley when said tensioning mechanism is actuated.

7. A safety alarm device according to claim 2, wherein said safety belt system includes is a safety belt buckle and includes a longitudinally displaceable ejector disposed in a buckle housing and also includes a tongue that is adapted to be inserted into said buckle and to be held in position therein by a latching mechanism, and wherein said buckle is provided with said spring element, a spring arm of which, upon actuation of said tensioning mechanism, is released and extends into a path of movement of at least one of said tongue, said ejector, and said latching mechanism.

* * * * *